US006985181B2

(12) United States Patent
Ewedemi et al.

(10) Patent No.: US 6,985,181 B2
(45) Date of Patent: Jan. 10, 2006

(54) CMOS SENSOR ARRAY WITH A MEMORY INTERFACE

(75) Inventors: Odutola Oluseye Ewedemi, San Jose, CA (US); Zhonghan John Deng, Mountain View, CA (US); Ricardo Jansson Motta, Palo Alto, CA (US); David Xiao Dong Yang, Mountain View, CA (US)

(73) Assignee: Pixim, Inc., Mountain View, CA (US)

( * ) Notice: Subject to any disclaimer, the term of this patent is extended or adjusted under 35 U.S.C. 154(b) by 930 days.

(21) Appl. No.: 09/755,910

(22) Filed: Jan. 3, 2001

(65) Prior Publication Data

US 2001/0040631 A1 Nov. 15, 2001

Related U.S. Application Data

(63) Continuation-in-part of application No. 09/567,638, filed on May 9, 2000, now abandoned.

(51) Int. Cl.
*H04N 3/14* (2006.01)

(52) U.S. Cl. .................. 348/294; 348/317; 711/105; 711/154

(58) Field of Classification Search .............. 348/294, 348/317, 319, 311, 231.99, 222.1, 282; 711/105, 711/149, 154, 202
See application file for complete search history.

(56) References Cited

U.S. PATENT DOCUMENTS

| | | | | |
|---|---|---|---|---|
| 5,325,207 A | * | 6/1994 | Leksell et al. ............... 358/296 |
| 5,461,425 A | * | 10/1995 | Fowler et al. ............... 348/294 |
| 5,841,471 A | | 11/1998 | Endsley et al. |
| 6,057,539 A | * | 5/2000 | Zhou et al. ............... 250/208.1 |
| 6,400,824 B1 | * | 6/2002 | Mansoorian et al. ........ 380/269 |
| 6,434,665 B1 | * | 8/2002 | Shepherd et al. ........... 711/118 |
| 6,552,745 B1 | * | 4/2003 | Perner ........................ 348/308 |
| 6,580,454 B1 | * | 6/2003 | Perner et al. ............... 348/302 |
| 6,606,122 B1 | * | 8/2003 | Shaw et al. ................. 348/302 |
| 6,614,560 B1 | * | 9/2003 | Silverbrook ................ 358/443 |
| 6,665,012 B1 | * | 12/2003 | Yang et al. ................. 348/308 |
| 6,665,013 B1 | * | 12/2003 | Fossum et al. ............. 348/308 |
| 6,667,763 B1 | * | 12/2003 | Hsu et al. ............. 348/207.99 |
| 6,691,206 B1 | * | 2/2004 | Rubinstein ................. 711/105 |
| 6,697,112 B2 | * | 2/2004 | Morris et al. ............... 348/302 |
| 6,704,049 B1 | * | 3/2004 | Fossum ..................... 348/272 |

(Continued)

FOREIGN PATENT DOCUMENTS

EP 0655860 A1 5/1995

(Continued)

*Primary Examiner*—Thai Tran
*Assistant Examiner*—Jacqueline Wilson
(74) *Attorney, Agent, or Firm*—Carmen C. Cook; Patent Law Group LLP

(57) ABSTRACT

An image sensor includes a sensor or a pixel array, a data memory, and a logic circuit, all fabricated on the same integrated chip. The sensor or pixel array outputs digital signals as pixel data representing an image of a scene. The data memory is coupled to the sensor or pixel array for storing the pixel data. The logic circuit is coupled to the data memory and provides a memory interface for exporting the pixel data. The memory interface can be one of a SRAM, a DRAM or a packet protocol synchronous DRAM interface. Including a memory interface in the image sensor allows the image sensor to be coupled directly to the memory interface port of an external image processing unit. The image processing unit can access the image sensor using conventional memory access protocols, thus improving the efficiency and reducing the operational complexity of the image processing unit.

4 Claims, 5 Drawing Sheets

U.S. PATENT DOCUMENTS 6,744,068 B2 * 6/2004 Fossum et al. ................ 257/59
6,757,019 B1 * 6/2004 Hsieh et al. ................ 348/302

FOREIGN PATENT DOCUMENTS

| EP | 0833502 A2 | 4/1998 |
| EP | 0912043 A2 | 4/1999 |
| EP | 0932302 A2 | 7/1999 |
| GB | 2336497 A | 10/1999 |
| JP | 11275468 | 10/1999 |
| WO | WO 00/52759 | 9/2000 |

* cited by examiner

CMOS SENSOR ARRAY WITH A MEMORY INTERFACE

CROSS-REFERENCE TO RELATED APPLICATION

This is a continuation-in-part of U.S. application No.: 09/567,638, entitled "Integrated Digital Pixel Sensor Having a Sensing Area and a Digital Memory Area," filed on May 9, 2000, now abandoned and by David Yang, et al., two of which are the co-inventor thereof.

BACKGROUND OF THE INVENTION

1. Field of the Invention

The invention generally relates to image sensor systems; and in particular, the present invention relates to an image sensor including a memory interface.

2. Background of the Invention

Digital photography is one of the most exciting technologies that have emerged in the past years. With the appropriate hardware and software (and a little knowledge), anyone can put the principles of digital photography to work. Digital cameras, for example, are on the cutting edge of digital photography. Recent product introductions, technological advancements, and price cuts, along with the emergence of email and the World Wide Web, have helped make digital cameras the hottest new category of consumer electronics products.

Digital cameras, however, do not work in the way that traditional film cameras do. In fact, they are more closely related to computer scanners, copiers, or fax machines. Most digital cameras use an image sensor or a photosensitive device, such as a charged-coupled device (CCD) or a Complementary Metal-Oxide Semiconductor (CMOS) device to sense a scene. The photosensitive device reacts to light reflected from the scene and can translate the strength of that reaction into electronic charging signals that are further digitized. By passing light through red, green, and blue filters, for example, the reaction can be gauged for each separate color spectrum. When the readings are combined and evaluated via software, the camera can determine the specific color of each segment of the picture. Because the image is actually a collection of numeric data, it can easily be downloaded into a computer and manipulated for more artistic effects.

In conventional digital imaging applications, an image sensor is coupled to an imaging processing unit (typically an integrated circuit or a chip) for receiving and processing the captured image. FIG. 1 illustrates a conventional digital imaging system including an image sensor coupled to an image processing unit. Referring to FIG. 1, image sensor 10, which can be a charged-coupled device (CCD) or a Complementary Metal-Oxide Semiconductor (CMOS) sensor, communicates with image processing unit 20 via a pixel data bus 12. After image sensor 10 captures an image, sensor readout is performed by exporting the pixel data one pixel at a time on the pixel-bit wide pixel data bus 12. Conventional image sensors provide either digital pixel data or analog pixel values as output signals on the pixel data bus. Here, the term "pixel data" is used collectively to refer to both the digital pixel data and the analog pixel value generated by an image sensor. Image processing unit 20 is coupled to a memory 24 for storing pixel data received from image sensor 10 before the image data can be processed or manipulated. Referring to FIG. 1, image processing unit 20 typically includes two interfaces: a sensor interface port 22a coupled to image sensor 10 for receiving sensor readout from the image sensor; and a memory interface port 22b coupled to memory 24 for storing the sensor readout. Thus, in operation, for every frame of image captured, image processing unit 20 first receives sensor readout from image sensor 10 one pixel at a time on pixel data bus 12. Image processing unit 20 directs the received pixel data for storage in memory 24. Thereafter, image processing unit 20 can access the frame of image data through memory interface port 22b.

The conventional digital imaging system of FIG. 1 has several disadvantages. First, because pixel data are read out one pixel at a time from the image sensor, sensor readout can be undesirably slow, particularly for large image array. The speed of the conventional digital imaging system is limited by the pixel transmission rate of the pixel data bus 12 and the pixel data bus becomes the data transmission bottleneck of the imaging system. Second, image sensor 10 exports pixel data according to a preloaded pixel access pattern and the access pattern cannot be changed readily during sensor readout. Thus, if a change in the pixel access pattern is desired, image processing unit 20 has to first stop the current access and reload the new access pattern before sensor readout can begin again.

What is needed is an image sensor which provides a convenient and efficient pixel data interface with an image processing device.

SUMMARY OF THE INVENTION

According to the present invention, an image sensor includes a sensor array, a data memory, and a logic circuit, all fabricated on the same integrated chip. The sensor array is a two-dimensional array of pixel elements that outputs digital signals as pixel data representing an image of a scene. The data memory is coupled to the sensor array for storing the pixel data. The logic circuit is coupled to the data memory and provides a memory interface for exporting the pixel data.

In one embodiment, the memory interface is one of a SRAM, a DRAM or a packet protocol synchronous DRAM interface.

In one embodiment, the sensor array of the image sensor includes an array of pixel elements, each pixel element including a photodetector and an analog-to-digital conversion circuit. The photodetector produces an analog signal when the image sensor is exposed to a target. The analog signal is immediately converted to a digital signal.

In another embodiment, the image sensor includes a pixel array such as an active pixel array instead of a sensor array. The pixel array outputs analog pixel values as pixel data. The image sensor may further include an analog-to-digital conversion circuit for converting the analog pixel values from the pixel array to digital pixel data.

In still another embodiment, the image sensor includes a sensor array or a pixel array and a dual-port memory coupled to the sensor or pixel array, all fabricated on the same integrated chip. The dual-port memory provides a memory interface for exporting pixel data.

By including a memory interface in the image sensor of the present invention, the image sensor can be coupled directly to the memory interface port of an external image processing unit. The image processing unit is able to access the image sensor using conventional memory access protocols, thus improving the efficiency and reducing operational complexity of the image processing unit.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

According to the present invention, an image sensor includes an integrated on-chip memory and a memory interface for outputting pixel data. By including a memory interface in the image sensor of the present invention, the image sensor can be coupled directly to the memory interface port of an external image processing unit. The image processing unit is able to access the image sensor using conventional memory access protocols. In some embodiments, an image sensor of the present invention supports a SRAM, a DRAM or a RAMBUS memory interface. By providing an on-chip memory and a memory interface in an image sensor, the image sensor of the present invention facilitates high speed pixel readout between the image sensor and the image processing device. The pixel data transmission bandwidth is limited only by the speed of the memory interface. Furthermore, by using the memory interface of the image sensor for sensor readout, the image processing device can access pixel data in the image sensor with greater convenience and flexibility not available in conventional image sensors. For instance, the pixel data access pattern is not limited to a preloaded access pattern but rather, the image processing unit can change the pixel access pattern on-the-fly as needed depending on the imaging application.

Figure 2:
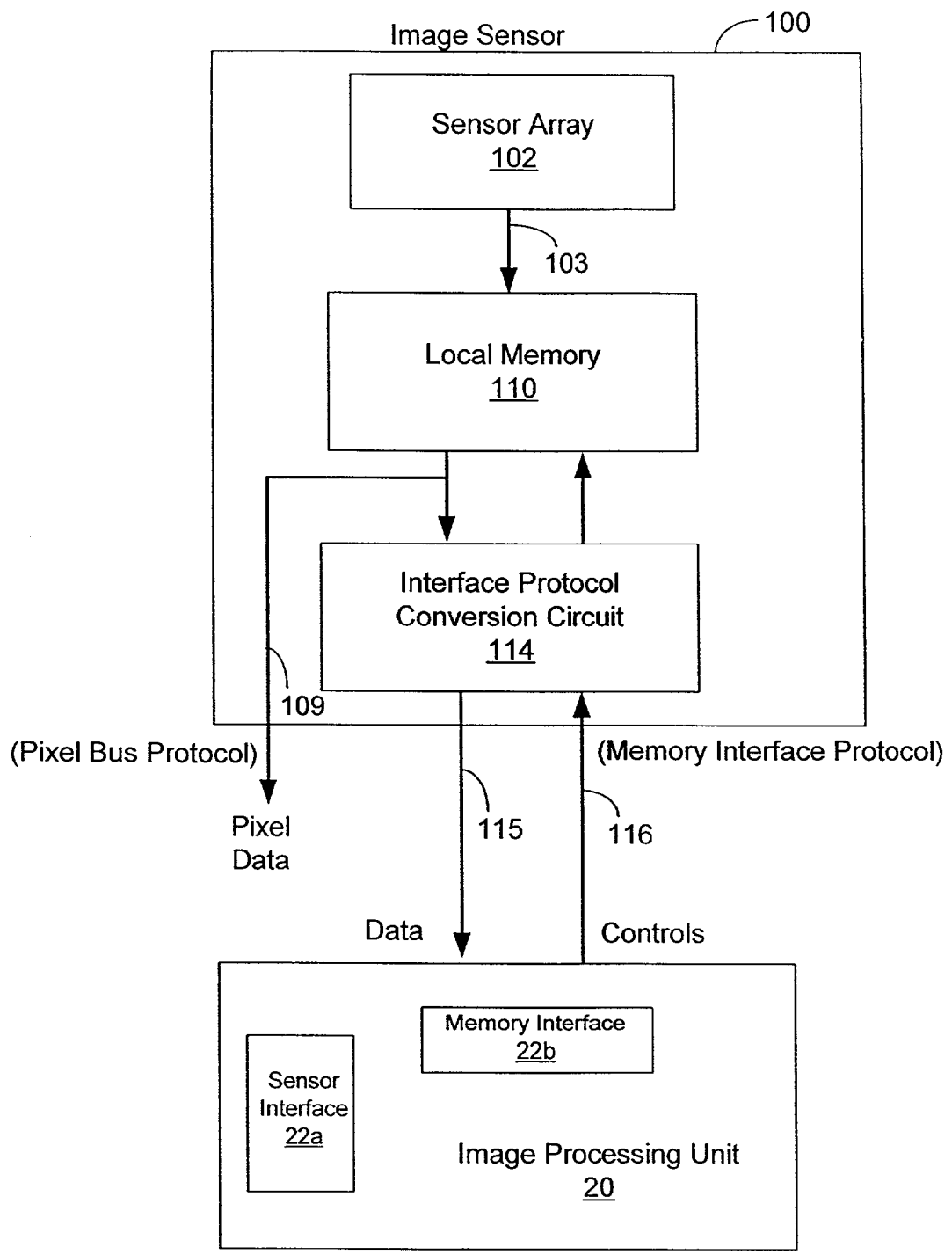
FIG. 2 illustrates a block diagram of an image sensor according to one embodiment of the present invention.

FIG. 2 illustrates a block diagram of an image sensor according to one embodiment of the present invention. Image sensor 100 may be used in an image capturing device such as a digital camera for capturing stationary or video photography. In the present embodiment, image sensor 100 includes a sensor array 102, a local memory 110, and an interface protocol conversion circuit 114. Sensor array 102 is a two-dimensional array of light detecting elements, also called photodetectors. In FIG. 2, sensor array 102 is arranged as N rows by M columns of photodetectors and has an image resolution of NXM pixels. If color applications are desired, a mosaic of selectively transmissive filters is superimposed in registration with each of the photodetectors so that a first, second, and third selective group of photodetectors are made to sense three different color ranges, for example, the red, green, and blue ranges of the visible spectrum, respectively.

In image sensor 100 of FIG. 2, sensor array 102 is implemented as a digital pixel sensor (DPS) array which generates digital signals as sensor readout on output bus 103. In the present description, a DPS array or a sensor array refers to an array of pixel elements where each pixel element includes a photodetector and an analog-to-digital (A/D) conversion circuit. The photodetector produces an analog signal when the image sensor is exposed to a target light source. The analog signal is immediately converted to a digital signal by the A/D conversion circuit such that each pixel element produces a digital output signal. Hence, the image sensor is referred to as a digital pixel sensor (DPS) and the pixel array is referred to as a sensory array or a DPS array.

A digital pixel sensor (DPS) provides a digital output signal at each pixel element representing the light intensity detected by that pixel element. The combination of a photodetector and an analog-to-digital conversion circuit (e.g. an A/D converter) helps enhance signal detection, reduces power consumption, and improves overall system performance. In the present embodiment, DPS array 102 implements a digital pixel sensor architecture. One exemplary DPS architecture is described in U.S. Pat. No. 5,461,425 (the '425 patent) which utilizes pixel level analog-to-digital conversion and is hereby incorporated by reference in its entirety. The photodetector of a DPS array are sometimes referred to as a sensor pixel or a sensor element or a digital pixel, which terms are used to indicate that each of the photodetectors of a DPS array includes an analog-to-digital (A/D) conversion circuit, and is distinguishable from a conventional photodetector which includes a photosensor and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

Furthermore, in the present embodiment, DPS array 102 utilizes Multi-Channel Bit Serial (MCBS) analog-to-digital conversion (ADC) as described in U.S. Pat. No. 5,801,657 to Fowler et al. which is hereby incorporated by reference in its entirety. DPS array 102 uses a k-bit MCBS ADC and outputs digital signals represented in Gray code. An MCBS ADC has many advantages applicable to image acquisition and more importantly, facilitates a high-speed readout. Of course, other ADC techniques can be used, such as a first order sigma delta modulation ADC.

Figure 3:
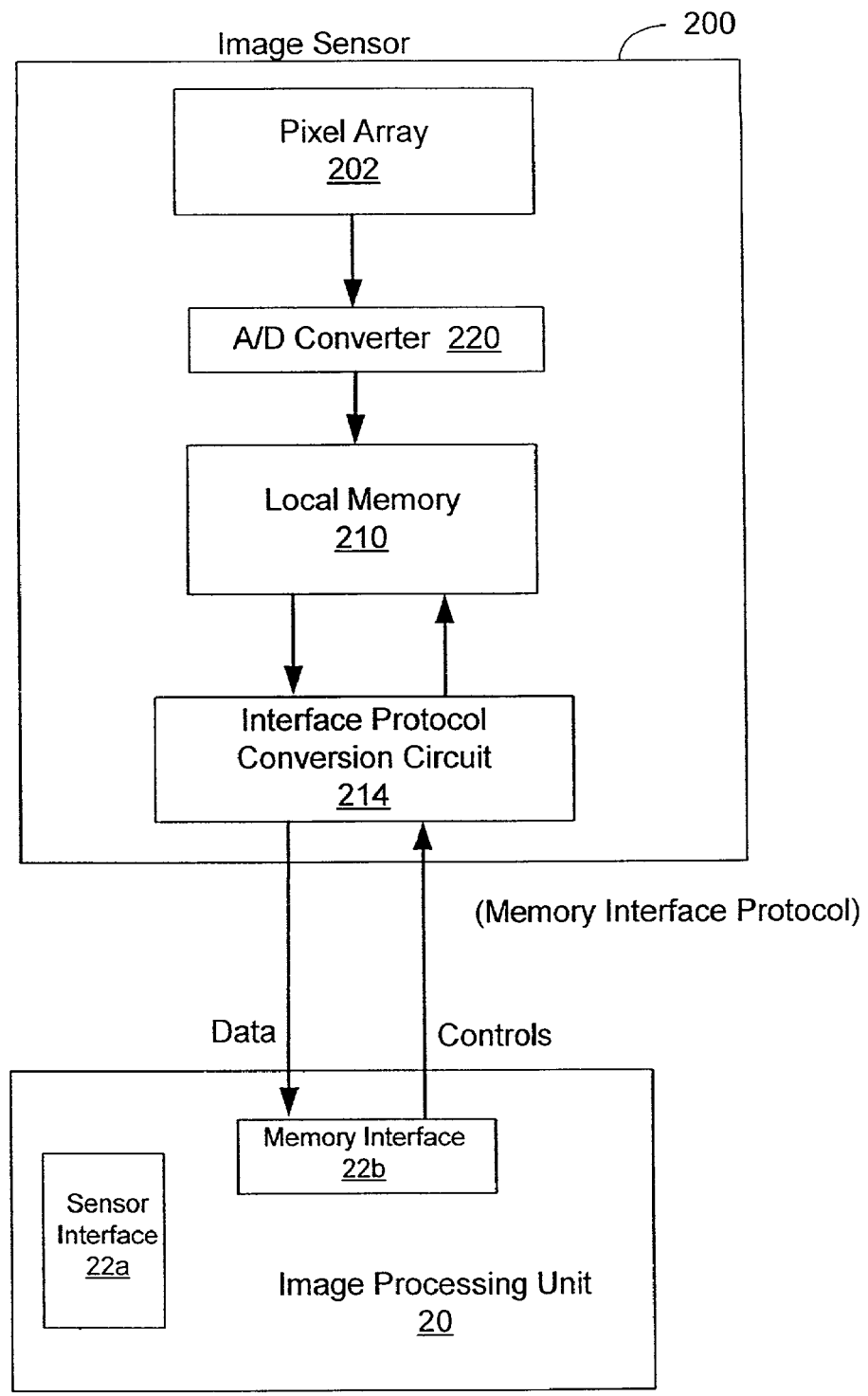
FIG. 3 illustrates a block diagram of an image sensor including an APS pixel array according to one embodiment of the present invention.

Of course, the image sensor of the present invention can be constructed using other types of imaging array such as a CCD pixel array or a CMOS pixel array, including an active pixel sensor (APS) array. FIG. 3 illustrates an image sensor including an APS pixel array according to one embodiment of the present invention and will be described in more detail below.

Image sensor 100 further includes an integrated on-chip memory (also called local memory) 110 for storing at least one frame of image data from sensor array 102. U.S. patent application Ser. No. 09/567,638 describes an integrated digital pixel sensor (DPS) with an on-chip memory for storing at least a frame of image data. The incorporation of an on-chip memory in an image sensor alleviates the data transmission bottleneck problem associated with the use of an off-chip memory for storage of the pixel data. In particular, the integration of a memory with a DPS sensor makes feasible the use of multiple sampling for improving the quality of the captured images. U.S. patent application Ser. No. 09/567,786 describes a method for facilitating image multiple sampling using a time-indexed approach. The aforementioned patent applications are incorporated herein by reference in their entireties. In image sensor 100, local memory 110 has the capacity to store pixel data for at least N by M pixels in k-bits. Of course, local memory 110 may also include additional storage capacity for storing other parameters used in the operation of image sensor 100, such as data used in the multiple sampling operation. In other embodiments, local memory 110 can have the capacity to store multiple frames of pixel data or a partial-frame of pixel data.

In operation, an image is focused on sensor array 102 such that a different portion of the focused image impinges on each of the sensor pixels in the array. Each sensor pixel comprises a photodetector whose conductivity (i.e. charge storage rate) is related to the intensity of light impinging upon photodetector. The analog current through the photodetector thus corresponds to the intensity of light impinging upon the photodetector. The analog signals from all photodetectors in array 102 are simultaneously converted into serial bit streams by a dedicated A/D conversion circuit immediately coupled to each sensor pixel. The serial bit streams, generated over a frame period, is provided on bus 103 as digital output signals representative of the average intensity of light impinging on the photodetectors.

In image sensor 100 of FIG. 2, sensor readout from sensor array 102 is carried out on bus 103 using a sensor readout protocol. Pixel data from sensor array 102 is written in local memory 110 one pixel at a time. In some cases, sensor array 102 provides sensor readout in the form of bit planes and pixel data are stored in local memory 110 in a sensor-bit arrangement. If it is important that the pixel data stored in local memory 110 be arranged in a pixel-bit arrangement, a method for performing pixel-bit rearrangement in an image sensor is described in copending and commonly assigned U.S. patent application Ser. No. 09/638,503 to Ewedemi et al. and can be used to rearrange the pixel data in local memory 110. Furthermore, if it is important to perform other pixel normalization functions, such as Gray code to binary conversion, digital correlated double sampling operation, and multiple sampling normalization operation, a pixel normalization circuit, such as that described in copending and commonly assigned U.S. patent application Ser. Nos. 09/638,502 and 09/638,520, both of Ewedemi et al., may be included in image sensor 100 of the present invention.

Sensor readout from sensor array 102 on bus 103 is stored in local memory 110. In conventional operation, the pixel data stored in local memory 110 are provided to an external image processing device on bus 109 where bus 109 is a pixel-bit wide pixel data bus and the pixel data are exported one pixel at a time. In the present embodiment, image sensor 100 includes another pixel data interface for facilitating high-speed and flexible pixel data output from the image sensor. Referring to FIG. 2, image sensor 100 further includes an interface protocol conversion circuit 114 for providing a memory interface for exporting pixel data stored in local memory 110. Thus, an external image processing device can access pixel data captured and stored in image sensor 100 using a memory interface protocol, instead of using the traditional pixel data bus protocol.

Figure 1:
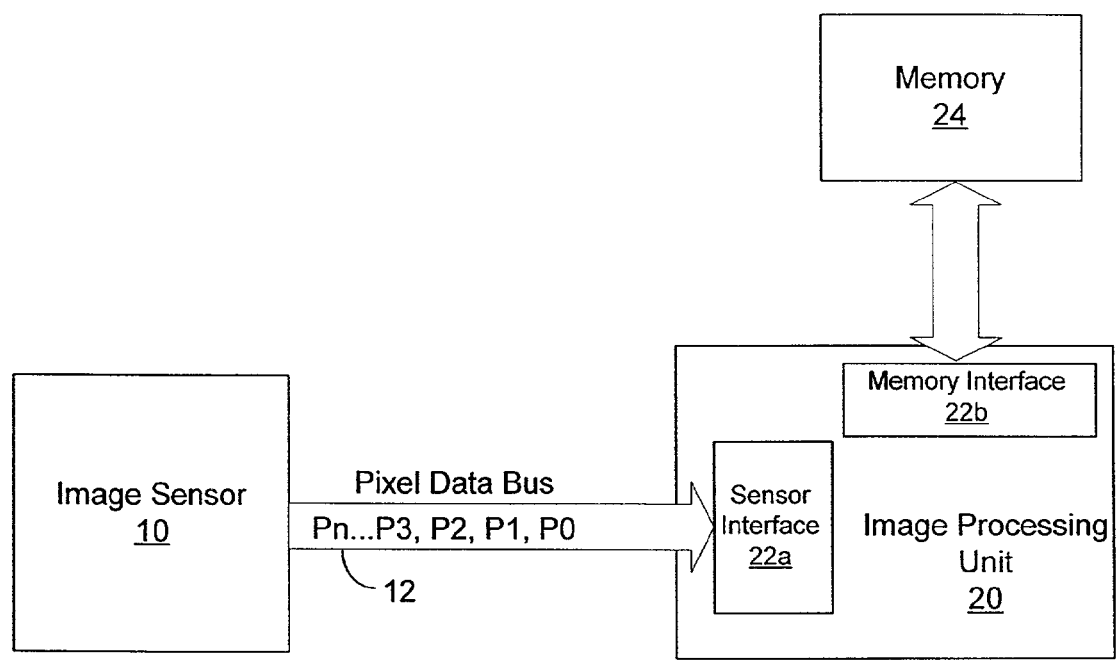
FIG. 1 illustrates a conventional image system incorporating an image sensor coupled to an image processing unit.

In FIG. 2, image sensor 100 is shown coupled to an image processing unit 20. Image processing unit 20 can be a digital signal processor (DSP) or other image processing devices such as an image compression and analysis device. Image processing unit 20 includes a sensor interface port 22a for coupling to the pixel data interface of a conventional image sensor. Image processing unit 20 further includes a memory interface port 22b which, in a conventional configuration such as that shown in FIG. 1, is coupled to a memory for storing pixel data received from an image sensor on the sensor interface port 22a. In FIG. 2, instead of being coupled to sensor interface port 22a as it is conventionally done, image sensor 100 is coupled to memory interface port 22b of image processing unit 20. Specifically, image sensor 100 communicates with image processing unit 20 on pixel data bus 115 and control bus 116 using a memory interface protocol. In one example, memory 110 is implemented as a frame buffer and image processing unit 20 supports a dynamic random access memory (DRAM) interface on memory interface port 22b. Interface protocol conversion circuit 114 accesses local memory 110 using a frame buffer protocol and provides pixel data to image processing unit 20 using a DRAM interface protocol. In another example, local memory 110 is implemented as a static random access memory (SRAM) and image processing unit 20 supports a dynamic random access memory (DRAM) interface on memory interface port 22b. Interface protocol conversion circuit 114 can access local memory 110 using a SRAM interface protocol and provides pixel data to image processing unit 20 using a DRAM interface protocol. As such, interface protocol conversion circuit 114 provides a translation of the memory interface protocols between the local memory 110 and image processing unit 20. By coupling image sensor 100 to memory interface port 22b of image processing unit 20, image processing unit 20 can access image sensor 100 as if accessing a conventional DRAM. In this manner, image sensor 100 provides an external imaging processing device with a standard memory interface protocol having a wide bandwidth and a high degree of readout flexibility.

As described above, the image sensor of the present invention can be implemented using other types of pixel array, including a CCD array or an APS array. In that case, the pixel array will output analog pixel signals on the pixel data output bus and the necessary analog-to-digital conversion circuit is provided to convert the analog pixel signals into digital pixel data for storage in the local memory. FIG. 3 illustrates a block diagram of an image sensor incorporating an APS array according to one embodiment of the present invention. Image sensor 200 of FIG. 3 includes an APS pixel array 202 coupled to an A/D conversion circuit 220. Analog pixel values generated by APS sensor array 202 are provided to A/D conversion circuit 220 for converting into digital pixel data. The operation of image sensor 200 is similar to image sensor 100 of FIG. 2. Image sensor 220 includes an on-chip memory 210 and an interface protocol conversion circuit 214 for providing a memory interface to an external image processing device. In the present configuration, image sensor 200 is coupled to memory interface port 22b of image processing unit 20 where the image processing unit can access pixel data in image sensor 200 as if the image sensor is a memory device. In other embodiments, an image sensor with an APS array may not include a A/D conversion circuit. In that case, the image sensor stores analog pixel values in the local memory and outputs analog pixel values on the memory interface. The external image processing unit is then responsible for converting the pixel values into digital pixel data.

The interface protocol conversion circuit of the image sensor of the present invention can be constructed to support any kinds of memory interface protocols. As described above, an image sensor of the present invention can support at least a SRAM, a DRAM and a RAMBUS memory interface. Presently, existing image processing devices typically include a DRAM interface as dictated by an industrial standard (e.g. JEDEC 21-C). Therefore, providing a DRAM interface on an image sensor allows the image sensor to be readily coupled to existing image processing devices and be accessed as a DRAM relative to the image processing device. Furthermore, a DRAM interface provides a high data bandwidth for accessing pixel data. A standard DRAM interface is 133 MHz and 16 bits wide, thus having a total bandwidth of 2.128 Gbits/second(s). This is a marked improvement over the 250 Mbits/s data bandwidth provided by a conventional image sensor on a 10-bit 25 MHz pixel data bus. A conventional DRAM interface includes a bi-directional data bus, an address bus, and control signals including CLK, CKE, CS, RAS, CAS, WE and/or OE.

A SRAM interface, on the other hand, generally has similar data bandwidth capability as a DRAM interface but provides simplicity in access and controls. Specifically, a SRAM interface does not require refresh cycles and provides predictability of read/write cycle timing. A SRAM interface is particularly useful when the image sensor is integrated with an image processing device on a single integrated circuit. In such a configuration, the SRAM interface of the image sensor can provide a wide data bus to reduce the data access latency. A typical SRAM interface includes a bi-directional data bus, an address bus, and control signals including RE/WE and CLK.

If a very high data bandwidth is desired, then a packet protocol synchronous DRAM interface, commonly called a RAMBUS™ interface, can be used on the image sensor of the present invention. A RAMBUS interface can sustain a peak data rate of up to 12.8 Gbits/s which is six times greater than the data rate of the standard DRAM interface. A RAMBUS interface is suitable when the image sensor includes a very large pixel arrays or when the image sensor is used in real-time image processing. A typical RAMBUS interface includes a bi-directional data bus (BusData) and control signals including BusEnable, BusCtrl, RxClk and TxClk.

Figure 4:
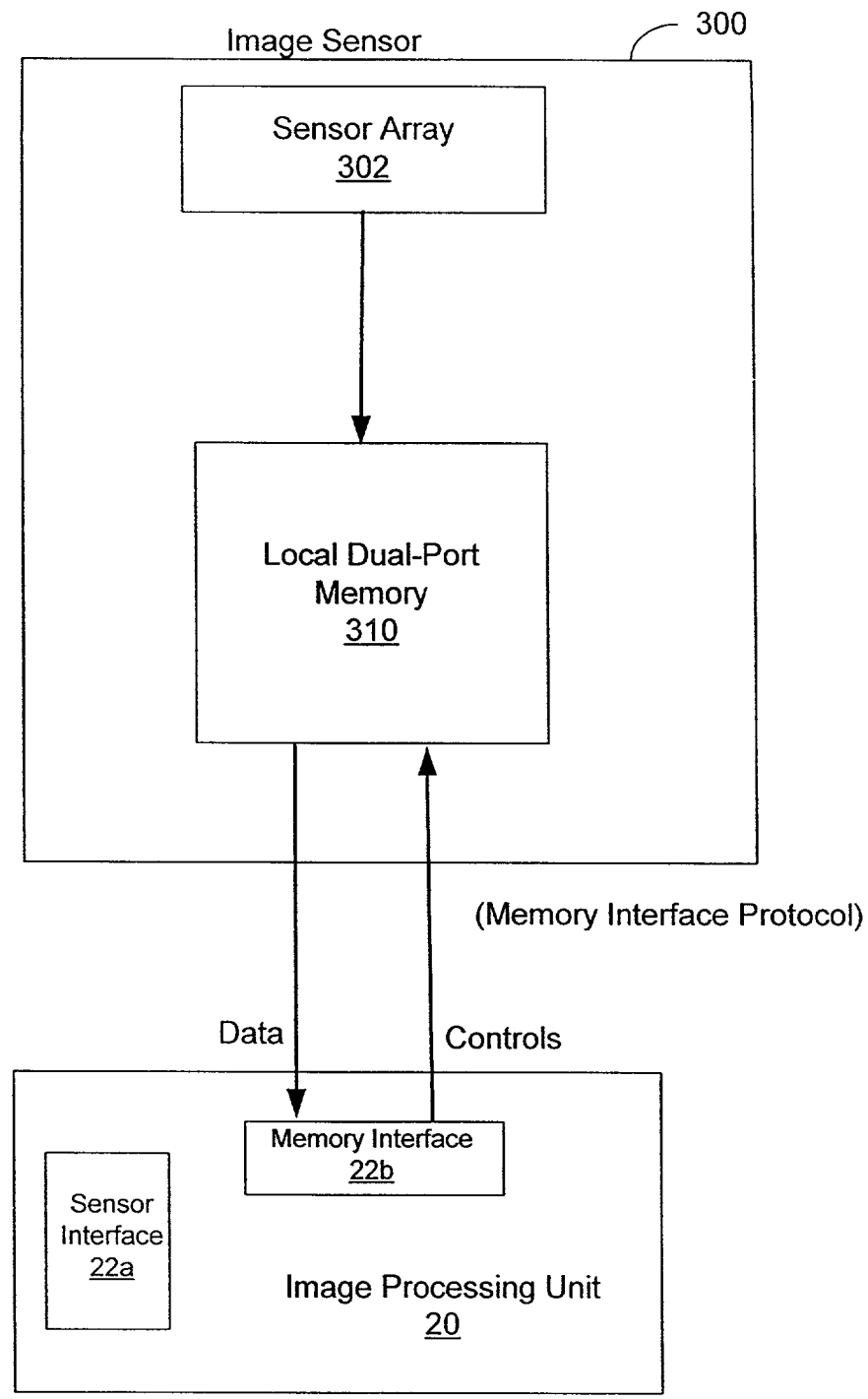
FIG. 4 illustrates a block diagram of an image sensor including a dual port memory according to one embodiment of the present invention.

According to another embodiment of the present invention, an image sensor includes an on-chip dual port memory for providing a memory interface to export pixel data. Referring to FIG. 4, local memory 310 of image sensor 300 is implemented as a dual-port memory. For example, dual-port SRAM are well known in the art. By using a dual-port memory 310 in image sensor 300, pixel data from sensor array 302 can be written to dual-port memory 310 via one of the ports and image processing unit 20 can access the stored pixel data via the other port. By using a dual-port memory in image sensor 300, a more compact implementation of an image sensor of the present invention can be obtained.

Figure 5:
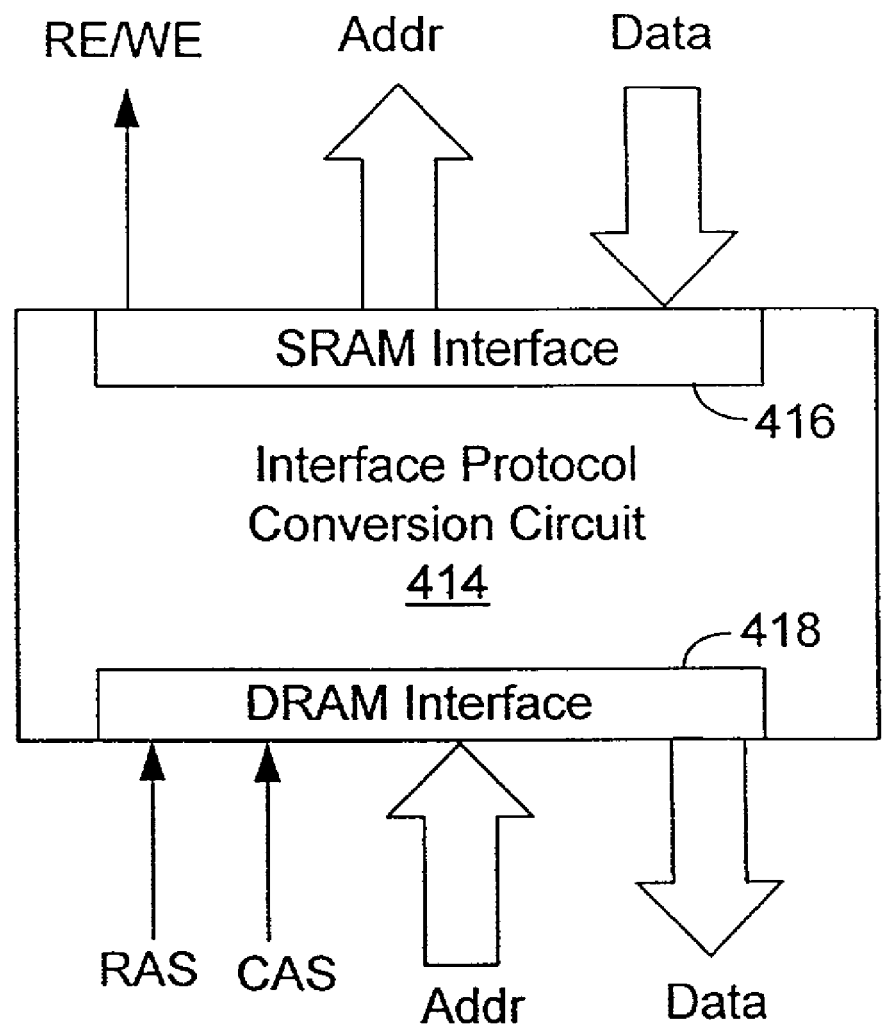
FIG. 5 illustrates one embodiment of an interface protocol conversion circuit for use in converting between an SRAM interface to a DRAM interface.

FIG. 5 illustrates one embodiment of an interface protocol conversion circuit for use in converting between an SRAM interface to a DRAM interface. Interface protocol conversion circuit 414 includes a SRAM interface port 416 for interfacing with a local memory of an image sensor. RAM interface port 416 provides a read enable/write enable output signal and address signals and receives as input the data from the local memory. Interface protocol conversion circuit 418 also includes a DRAM interface port 418 for interfacing with an image processing device external to the image sensor. DRAM interface port 418 receives as input a row address strobe (RAS) signal, a column address strobe (CAS) input signal and address signals. DRAM interface port 418 provide data output in response to the RAS, CAS and address input signals.

The above detailed descriptions are provided to illustrate specific embodiments of the present invention and are not intended to be limiting. Numerous modifications and variations within the scope of the present invention are possible. The present invention is defined by the appended claims.

We claim:

1. An imaging system, comprising:
an image sensor, comprising:
a sensor array, including a two-dimensional array of pixel elements, that outputs digital signals as pixel data representing an image of a scene;
a data memory coupled to said sensor array and fabricated with said sensor array on a first integrated circuit, said data memory for storing said pixel data, wherein said data memory is configured using a first memory interface protocol;
a logic circuit coupled to said data memory and fabricated with said data memory on said first integrated circuit, said logic circuit for accessing said data memory using said first memory interface protocol and performing memory interface conversion to provide an output memory interface configured using a second memory interface protocol different than said first memory interface protocol for exporting said pixel data out of said first integrated circuit; and
an image processing device formed on a second integrated circuit separate from said first integrated circuit and including a memory interface port configured using said second memory interface protocol;
wherein said image sensor is coupled to said memory interface port of said image processing device and said image processing device accesses pixel data in said image sensor using said second memory interface protocol.

2. The imaging system of claim 1, wherein said second memory interface protocol of said image sensor is a SRAM interface protocol.

3. The imaging system of claim 1, wherein said second memory interface protocol of said image sensor is a DRAM interface protocol.

4. The imaging system of claim 1, wherein said second memory interface protocol of said image sensor is a packet protocol synchronous DRAM interface protocol.

* * * * *